United States Patent
Shaylor

(10) Patent No.: US 6,760,907 B2
(45) Date of Patent: *Jul. 6, 2004

(54) CODE GENERATION FOR A BYTECODE COMPILER

(75) Inventor: Nicholas Shaylor, Newark, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,061

(22) Filed: Jun. 30, 1998

(65) Prior Publication Data

US 2002/0104076 A1 Aug. 1, 2002

(51) Int. Cl.[7] ................................................ G06F 9/45
(52) U.S. Cl. ..................... 717/158; 717/108; 717/116; 717/118; 717/129; 717/130; 717/131; 717/148; 717/157; 717/159
(58) Field of Search ................................ 717/145–161, 717/124–133, 117–119, 106–108

(56) References Cited

U.S. PATENT DOCUMENTS

| 5,748,964 A | | 5/1998 | Gosling | |
|---|---|---|---|---|
| 5,835,771 A | * | 11/1998 | Veldhuizen | ................. 717/5 |
| 5,857,105 A | * | 1/1999 | Ayers et al. | ................. 717/8 |
| 6,170,083 B1 | * | 1/2001 | Adl-Tabatabai | ............ 717/158 |

FOREIGN PATENT DOCUMENTS

| EP | 0 908 819 A2 | * | 4/1999 | ............ G06F/9/45 |
|---|---|---|---|---|
| EP | 0 943 990 A2 | * | 9/1999 | ............ G06F/9/45 |
| WO | WO 99/42925 | * | 8/1999 | ............ G06F/9/45 |
| WO | WO 99/61979 | * | 12/1999 | ............ G06F/9/00 |

OTHER PUBLICATIONS

Bacon et al., "Fast Static Analysis of C + + Virtual Function Calls", ACM, pp. 324–341, Oct. 1996.*
Ayers et al., "Aggressive Inlining", ACM, pp. 134–145, Jun. 1997.*
Hsieh et al., "Java Bytecode to Native Code Translation: The Caffeine Prototype and Preliminary Results", IEEE, pp. 90–97, Dec. 1996.*
Dean et al., "Vortex: An Optimizing Compiler for Object–Oriented Languages", ACM, pp. 83–132, Oct. 1996.*
Piumarta et al., "Optimizing Direct Threaded Code by Selective Inlining", ACM, pp. 291–300, Jun. 1998.*
Jagannathan et al., "Flow–Directed Inlining", ACM, pp. 193–205, May 1996.*
Dolby, "Automatic Inline Allocation of Objects", ACM, pp. 7–17, Jun. 1997.*
Armstrong, "HotSpot: A New Breed of Virtual Machines", http://www.javaworld.com/javaworld/jw–03–1998/jw–03–hotspot_p.html, Mar. 1998.*
Dean et al., "Towards Better Inlining Decisions Using Inlining Trials", ACM, pp. 273–282, Jun. 1994.*

(List continued on next page.)

Primary Examiner—Antony Nguyen-Ba
Assistant Examiner—Ted T. Vo
(74) Attorney, Agent, or Firm—Stuart T. Langley; William J. Kubida; Hogan & Hartson LLP

(57) ABSTRACT

A method, system and apparatus for generating and optimizing native code in a runtime compiler from a group of bytecodes presented to the compiler. The compiler accesses information that indicates a likelihood that a class will be a particular type when accessed by the running program. Using the accessed information, the compiler selects a code generation method from a plurality of code generation methods. A code generator generates optimized native code according to the selected code generation method and stores the optimized native code in a code cache for reuse.

19 Claims, 4 Drawing Sheets

OTHER PUBLICATIONS

Srinivasan et al., "NetProf: Network-Based High-level Profiling of Java Bytecode", http://citeseer.nj.nec.com/8958.html, CiteSeer, NEC Research Institute, pp. i, 1–14, 1996.*

Ball et al, "Efficient Path Profiling", IEEE, pp.: 46–57, 1996.*

K. Ebicioglu, E. Altman and E. Hokenek, "A JAVA ILP Machine Based on Fast Dynamic Compilation," IBM T.J. Watson Research Center, IEEE MASCOTS Conference, Eilat, Israel, Jan. 9–10, 1997.

S. Singhal, B. Nguyen, R. Redpath, M. Fraenkel, and J. Nguyen, "Building High-Performance Applications and Servers in Java: An Experiential Study," IBM T.J. Watson Research Center, Feb. 5, 1997.

* cited by examiner

CODE GENERATION FOR A BYTECODE COMPILER

BACKGROUND OF THE INVENTION

1. Field of the Invention

The present invention relates, in general, to compilers, and, more particularly, to a code generation technique for optimizing execution of programs represented as bytecodes.

2. Relevant Background

Bytecode programming languages such as the Java™ programming language (a trademark of Sun Microsystems, Inc.) represent computer programs as a set of bytecodes. Each bytecode is a numeric machine code for a "virtual machine" that exists only in software on a client computer. The virtual machine is essentially an interpreter that understands the bytecodes, interprets the bytecodes into machine code, then runs the machine code on a native machine.

Bytecode programming languages such as the Java programming language are gaining popularity among software application developers because they are easy to use and highly portable. Programs represented as bytecodes can be readily ported to any computer that has a virtual machine capable of properly interpreting and translating the bytecodes. However, because bytecode programming languages must be interpreted at run time on the client computer, they have suffered from an inability to execute at speed competitive with traditional compiled languages such as C or C++.

The speed limitations of bytecode languages are primarily related to the compilation process. Compilation is the process by which programs authored in high level language (i.e., human readable) are translated into machine readable code. There are four basic steps to the compilation process: tokenizing, parsing, code generation, and optimization. In traditional compiled programs all of these steps are completed prior to run time, whereas in interpreted languages such as BASIC, all of the compilation steps are performed at run time on an instruction-by-instruction basis. Command shells like CSH are also examples of interpreters that recognize a limited number of commands. Interpreted languages result in inefficiency because there is no way to optimize the resulting code.

In a bytecode programming language tokenizing and parsing occur prior to run time. After parsing the program is translated into bytecodes that can be interpreted by a virtual machine. As a result, a bytecode interpreter is faster than a language interpreter such as in some of the original BASIC programming language implementations. Also, the resulting programs when represented in bytecode format are more compact than a fully compiled program. These features make bytecode languages a useful compromise in networked computer environments where software is transferred from one machine for execution on another machine.

In the Java programming environment, the program that performs the translation to bytecodes is called "javac" and is sometimes referred to as a Java compiler (although it performs only part of the compilation process described above). The program that interprets the bytecodes on the client computer is called a Java virtual machine (JVM). Like other interpreters, the JVM runs in a loop executing each bytecode it receives. However, there is still a time consuming translation step on the virtual machine as the bytecodes are interpreted. For each bytecode, the interpreter identifies the corresponding series of machine instructions and then executes them. The overhead involved in any single translation is trivial, but overhead accumulates for every instruction that executes. In a large program, the overhead becomes significant compared to simply executing a series of fully-compiled instructions. As a result, large applications written in the Java programming language tend to be slower than the equivalent application in a fully compiled form.

To speed up execution, virtual machines have been coupled with or include a just-in-time compiler or JIT. The JIT improves run-time performance of bytecode interpreters by compiling the bytecodes into native machine code before executing them. The JIT translates a series of bytecodes into machine instructions the first time it sees them, and then executes the machine instructions instead of interpreting the bytecodes on subsequent invocations. The machine instructions are not saved anywhere except in memory, hence, the next time the program runs the JIT compilation process begins anew.

The result is that the bytecodes are still portable and in many cases run much faster than they would in a normal interpreter. Just-in-time compiling is particularly useful when code segments are executed repeatedly as in many computational programs. Just-in-time compiling offers little performance improvement and may actually slow performance for small code sections that are executed once or a few times and then not reused.

One limitation of JIT technology is that the compiling takes place at run-time and so any computation time spent in trying to optimize the machine code is overhead that may slow execution of the program. Hence, many optimization techniques are not practical in prior JIT compilers. Also, a JIT compiler does not see a large quantity of code at one time and so cannot optimize over a large quantity of code. One result of this is that the compiler cannot determine with certainty the set of classes used by a program. Moreover, the set of classes can change each time a given program is executed so the virtual machine compiler can never assume that the set of classes is ever unambiguously known.

Because of this uncertainty, it is difficult to produce truly optimal native code at run-time. Attempts to optimize with incomplete knowledge of the class set can be inefficient or may alter program functionality. Uncertainty about the class set gives rise to a large area of potential inefficiency in Java execution. The class set is a set of all classes that will be used to execute a particular instance of a Java language program. In a traditionally batch-compiled program, the entire universe of classes that will be used by the program is known at compile time greatly easing the optimization task.

A common program occurrence is that a first method (the caller method) calls a second method (the target method) in a process referred to as a "method call". This method call process is advantageous from a programmers perspective, but consumes many clock cycles. An important optimization in the compilation of object oriented program code is called "inlining". In fully compiled programs, inlining makes these target method calls more efficient by copying the code of the target method into the calling method.

However, because of the semantics of the Java platform the compiler cannot ever determine the entire class set. Because classes are extensible and dynamically loadable in Java, methods can be overridden by subsequent extensions to a class, the compiler cannot know with certainty that a virtual method call will reach any particular method. In the Java programming language, a method by default can be overridden unless it is expressly defined as "final". All "non-final" methods are assumed to be overrideable.

Hence, all calls to non-final leaf methods must assume that the target method may be overridden at some time in the future. Hence, only time consuming virtual method call sequences have been used to invoke them in the past. The smaller the method, the more advantage inlining gives. A one-line method would typically spend far more time entering and exiting the routine as it does executing its contents. Tests have revealed that often as much as 85% of these non-final leaf method calls could be resolved if it were possible to know with certainty that no further classes would overload the methods.

What is needed is a method and apparatus for producing more optimal native code in an environment where the set of classes for a program is not unambiguously known. A need also exists for method and apparatus that deals with cases when knowledge of the class set is incomplete with tolerable impact on program execution performance.

SUMMARY OF THE INVENTION

Briefly stated, the present invention involves a method, system and apparatus for generating and optimizing native code in a runtime compiler from a group of bytecodes presented to the compiler. The compiler accesses information that indicates a likelihood that a class will be a particular type when accessed by the running program. Using the accessed information, the compiler selects a code generation method from a plurality of code generation methods. A code generator generates optimized native code according to the selected code generation method and stores the optimized native code in a code cache for reuse.

DETAILED DESCRIPTION OF THE PREFERRED EMBODIMENTS

Figure 1:
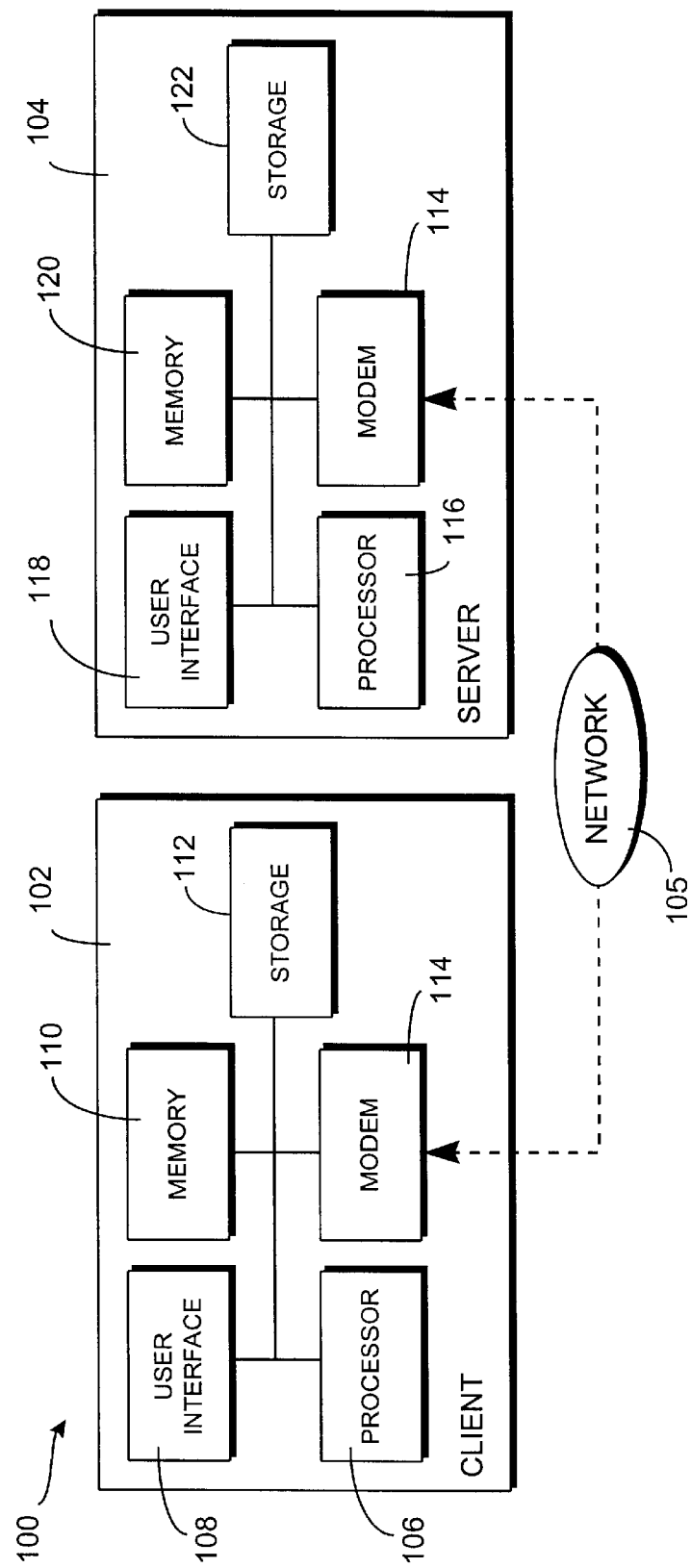
FIG. 1 illustrates a network computer environment implementing the method and system in accordance with the present invention.

The present invention is based on a premise that a system that is used to repeatedly run the same bytecode language programs may build up a suitably accurate knowledge of the set of classes used in those programs through a process called "profiling". Profiling may occur over a single execution of the program or over a number of program executions that occur in different sessions. It is this accumulation of knowledge derived at run time that turns a limitation of prior systems, namely the lack of run time-specific knowledge, into an advantage. The advantage results because the accumulated knowledge is specific to the particular run time environment and inherently accounts for any idiosyncrasies of the run time environment when profiling the running programs. In contrast, conventional compilation processes optimize based on generalized knowledge of typical program behavior in typical run time environments.

The system in accordance with the present invention generates efficient native code from a bytecode program when it "knows" or can reasonably believe that the class set used in prior executions will not be expanded upon. The term "know" and "knowledge" as used herein means that data structures within the system and/or software hold data representing the information that is known. Similarly, a reasonable belief means that the system and/or software hold information that indicates a condition more likely than not exists even though that condition cannot be known with certainty.

The present invention generates code at run time using a dynamic compiler that is responsive to the information that known or reasonably believed about the program that is executing. In a particular example, the dynamic compiler includes a number of code generation methods that it can select from for any particular group of bytecodes that it is compiling. The selection of which method to use in a particular case is based upon the knowledge that can be gained instantaneously by probing the code itself together with knowledge gathered over time from monitoring the execution of code.

Although the present invention is described in terms of a system that compiles all bytecodes in a program to native code, it should be understood that the invention is usefully employed in a system that compiles only selected groups of bytecodes. For example, the virtual machine in accordance with the present invention may include a conventional bytecode interpreter that operates in parallel with the dynamic compiler. In such an implementation, only selected groups of bytecodes may be compiled based upon their frequency of execution, the relative benefit that may be achieved by compiling the bytecodes, or other performance based criteria. Accordingly, these implementations are equivalent to the specific implementations described herein for purposes of the present invention.

The present invention specifically addresses optimization of native code through heavy use of inlining techniques when the code involves target method calls. Hence, the present invention is particularly useful in optimizing object-oriented programs that make use of many small objects and methods that frequently make calls to methods from other objects and the classes that describe those methods. The Java programming language is an example of a highly object oriented language that encourages tight object definitions using small limited purpose methods.

In a highly object oriented language, class extensibility is a key feature that eases programming and improves functionality. A class is extended when it is subclassed so that methods described by the class are overridden. Once overridden, all subsequent calls to an overridden method will use the new method, not the one originally described in the parent or abstract class when the receiver of the method call is the extended class. A significant utility of the present invention is that it provides a system and method for handling the complexities caused by subclassing in a running system.

FIG. 1 illustrates a computer system 100 configured to implement the method and apparatus in accordance with the present invention. A client computer 102 downloads a program residing on a server computer 104. The client computer has a processing unit 106 for executing program instructions that is coupled through a system bus to a user interface 108. User interface 108 includes available devices to display information to a user (e.g., a CRT or LCD display) as well as devices to accept information form the user (e.g., a keyboard, mouse, and the like). A memory unit 110 (e.g., RAM, ROM, PROM and the like) stores data and instructions for program execution. Storage unit 112 comprises mass storage devices (e.g., hard disks, CDROM, network drives and the like). Modem 114 converts data from the system bus to and from a format suitable for transmission across network 105. Modem 114 is equivalently substituted by a network adapter or other purely digital or mixed analog-digital adapter for a communications network.

Server 104 typically comprises a similar group of components including a processor 116, a user interface 118, and server memory 120. Server storage 122, in a particular example, stores programs represented in bytecode that are transmitted via modem 114 through network 105 to client computer 104. It should be understood that the present invention may be implemented on single computer rather than the network computer environment shown in FIG. 1 simply by storing the bytecode program on client storage unit 112.

In the description of the present invention, the term "class type" refers to characteristic that identifies a particular class and distinguishes a class from any other class or any subclass of the class itself. When a class is subclassed, a new class type results. The class type of a particular object can be determined from data stored in the class description. A class may be defined using the "final" keyword in which case it cannot be subclassed, otherwise it can be subclassed. Object oriented programming encourages subclassing, so the usual case (and indeed the default case in the Java programming language) is that a class is subclassable. When a class is subclassable, it may be subclassed any number of times resulting in a set of class types created over the entire program execution. At runtime when a method is called through a method call, only one particular type of this set of types is correct.

Figure 2:
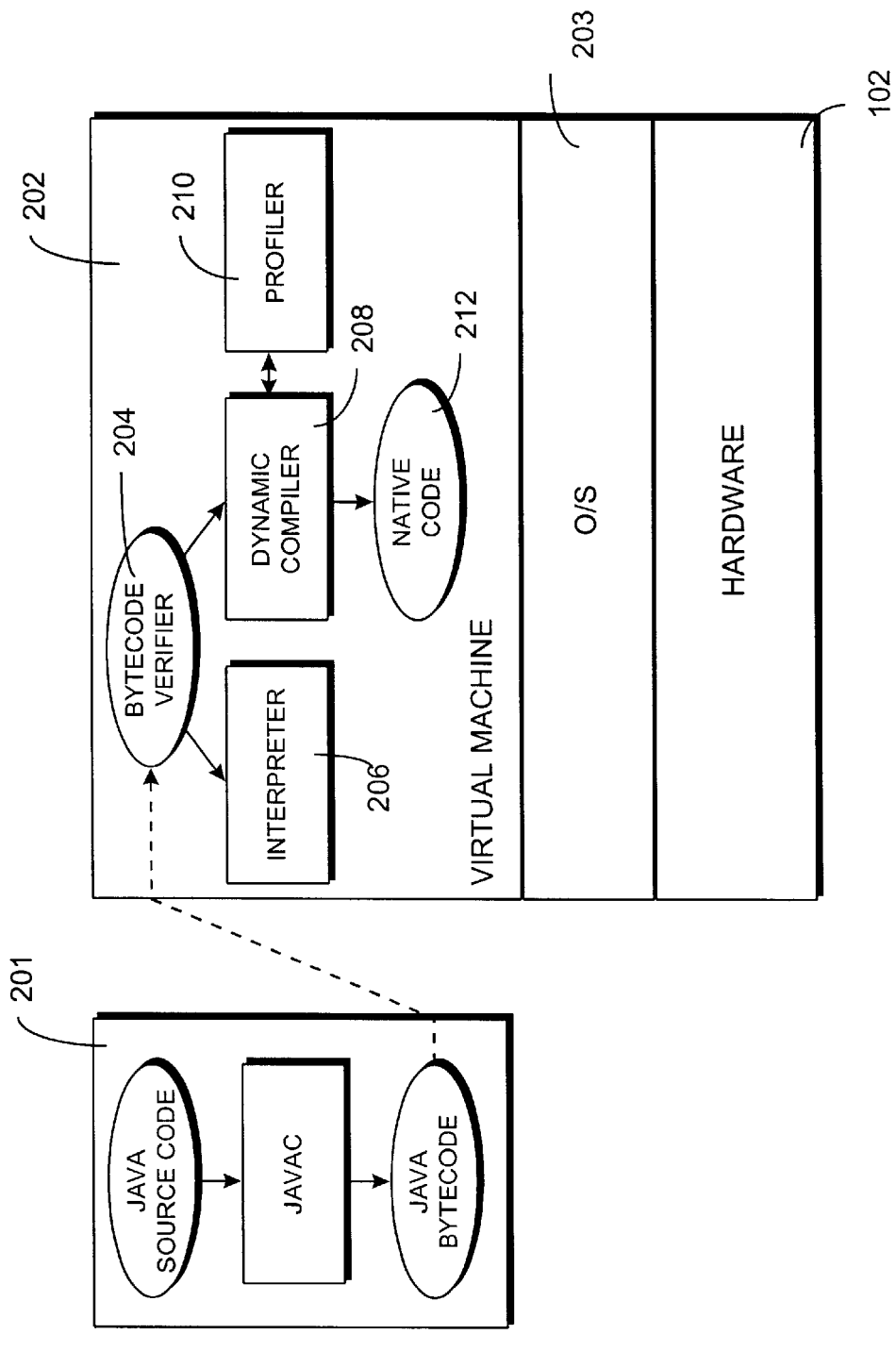
FIG. 2 shows a programming environment in accordance with the system and methods of the present invention.

FIG. 2 illustrates an exemplary Java programming environment including a "compile time environment" 201 and a "run time environment" 202. Developing and running a Java language program involves two steps. A programmer types in Java source code, which is converted by a Java compiler, such as the javac shown in FIG. 2, into a form called Java bytecode. As described above, the Java bytecodes are compact and portable which makes them an ideal form for storing and transferring a program in a network computer system.

The bytecode is then transferred to the runtime environment 202 to executed by a program known as the Java Virtual Machine (JVM). All JVMs understand the same bytecodes, so the bytecode form of a Java program can be run on any platform with a JVM. In this way, a JVM is a generic execution engine for Java bytecode—the JVM can be written once for a given platform, and then any bytecode program can be run by it. As in conventional JVMs, the preferred implementation includes a bytecode interpreter 206 that runs in parallel a dynamic compiler 208 to provide interpreted native code in a conventional manner while compiler 208 spends time generating optimized native code.

The dynamic compiler 208 in accordance with the present invention speeds up the execution of Java code by optimized compilation as described hereinbefore. Compiler 208 takes the Java bytecode and, in response to knowledge and performance information obtained from profiler 210, converts the bytecodes into native code for the user's specific type of hardware 102 and operating system 203. The present invention implements optimizing compiler technology to obtain high performance natively executable form of the program. Unlike the interpreted code from interpreter 206, optimized code from compiler 208 is saved for later reuse in code cache 212.

Profiler 210 is coupled to monitor code execution over time principally to monitor subclassing and overloading behavior of the particular program that is running. Of importance to the present invention, profiler 210 accumulates knowledge as to what classes are actually in use by the program. Profiler 210 generates profile data that is stored on a class-by-class or method-by-method basis in a profile data structure (not shown). Hence, although dynamic compiler 208 does not have any a priori knowledge of the class set, session-specific knowledge of the class set and class behavior can be obtained by profiler 210. In an exemplary implementation, profiler 210 includes data structures such as a table, having an entry for each class that it sees executed.

As execution proceeds, profiler 210 stores profile data in the data structure indicating whether a particular class has been subclassed, and indicating whether one class type of a particular class is most likely to be the correct class type at any particular method invocation. The data stored is thus more useful than a simple "fixed" indication that can be determined directly from the class description. Moreover, while the data structure in profiler 210 can be initialized to some known state at startup, it is dynamically changing to reflect the current behavior of the program in the environment in which it is being used.

It is useful to understand the present invention in terms of four categories of method calls in which the invention is particularly useful. The first case is a method call when the receiver object's class (i.e., the class defining the target method) is unambiguously known. This may result when the method is indicated as "final" (i.e., includes the keyword final in its description) or fixed code analysis has revealed the method to in fact be final even though it is not expressly declared final. In the second case the receiver class is known to be variable. A call to a method defined in an abstract class, or to a class known to be subclassed is an example of this case. These first two cases represent the extremes in which a class is known unambiguously to be fixed or the class is highly ambiguous with respect to which type it will be in a particular execution.

The remaining two cases involve gray areas in which some run time knowledge about the class can be exploited to provide generation of more efficient code. In the third case the receiver class is identified as one that more often than not is of a particular type. In accordance with the present invention, this case can be identified from profile-based feedback. In a fourth case the receiver class is very likely to be of a particular type because profile based feedback indicates that the class has never been subclassed in any previous execution.

In accordance with the present invention, in the first case it is known that the class cannot be overridden by subsequent method calls. In this case, method calls can always be called directly or inlined into the code generated for the calling method. These two types of optimizations (direct calls and inlining) are distinct but analogous operations. A direct call is faster to execute than a virtual method call. A still faster optimization is to actually copy the target method's code into the calling method's code (i.e., inlining). However, inlining will cause the code size to increase at run time and so place greater demands on the computer's instruction cache. Unless specified otherwise, the choice between these two optimization techniques is a matter of the appropriate code generation to meet the needs of a particular application.

In case two, a simple implementation of the present invention would generate code that implements a traditional virtual function call. This is justifiable because optimization requires greater overhead in such a case and may result in a very large amount of code to be generated for each call to the method. Alternatively, all possible classes are identified as cases in a "switch statement" so that the target method's code from each possible class is inlined into the code for the calling method. The switch is selected when the calling method is executed by testing the current class type and selecting the switch based on the test results.

In the third case, calls can be made directly to the method most likely to be correct with a small test being made in the code of the target method. If the class is not the correct one for the method, a virtual function call can be made. Alternatively, case three methods can be inlined, but with a test just before the first instruction of the inlined code that checks whether the class type is correct and makes a virtual method call instead if it is not.

In case four, method calls can be made efficient by calling the method directly. In accordance with the present invention, the code generated initially assumes that the class will never be subclassed. If, however, it subsequently is subclassed, then the first instruction of the method is patched to a small code fragment that tests the receiver and makes the virtual function call if it is not correct. If it is correct, it performs the instruction that was patched and branches back to the main method code.

The shorter the target method, the more important it is being inlined. To avoid recompilation of the calling methods, a test of the receiving class (i.e., the target method's class) will be required. Desirably this test adds little overhead and is relatively quick. A worst case example of a method calling a single instruction target method is demonstrated by a simple accessor method. For example assume a class Y having the description:

```
class Y {
    int value;              //declare "value" as an integer
                            //data type
    int length( ) {         //declare length( ) as a
    method     return value;  //that returns
    an integer "value"
    }                       //when called
}
    The calling method, for example, may be:
x = y.length( );
    The native code segment generated for the
calling method might become:
cmp [y+class],#constantForClassY    //compare y's
class type
                                    //to a
specified constant
bne vfCall                          //branch when
the
                                    //comparison
is not
                                    //equal
mov[y+value],x                      //move the
returned
                                    //"value" to x
```

In the above machine code, the first instruction implements a class type test that compares a class type read from the class description in memory to a predefined constant for the expected class. This predefined constant is determined when the code is generated and can be updated whenever the code is regenerated. When the two values are equal, the branch-on-not-equal instruction is skipped and the machine code implementing the inline method is executed. The case for the call-through of the virtual function table is handled at vfCall and will result in some performance penalty. This is expected to be an unusual case and so the performance does not matter.

It is contemplated that the code could be organized so that results of this class type test could be reused for multiple method calls. In instances where several calls methods of the same class and the target method's class could not have been subclassed from one call to the other, a single class type test can be made and used by all of the target method calls. This implementation spread the overhead associated with performing the class type test over a plurality of method calls thereby improving efficiency.

A way to achieve further inlining improvement is to remove the class test (e.g., the CMP and BNE instructions in the above example) altogether. The resulting code includes only the target method's code and so is very efficient. However, the inlined code will not be accurate if the target method is ever overridden. Hence, when this is done, the JVM must remember that if the target method's class is ever subclassed by a class that overrides the method, that inlined code segment must be replaced with a virtual call sequence.

The virtual call sequence could be bigger than anything it is replacing, so to solve this, the first instruction of the originally inlined code can be changed to an instruction that redirects program execution to a location at which instructions for implementing the virtual call sequence are located. Examples include a branch instruction, a call instruction, a breakpoint instruction, and the like. The choice of how to implement this feature is based on what gives a suitably efficient and flexible implementation for a particular machine.

Figure 3:
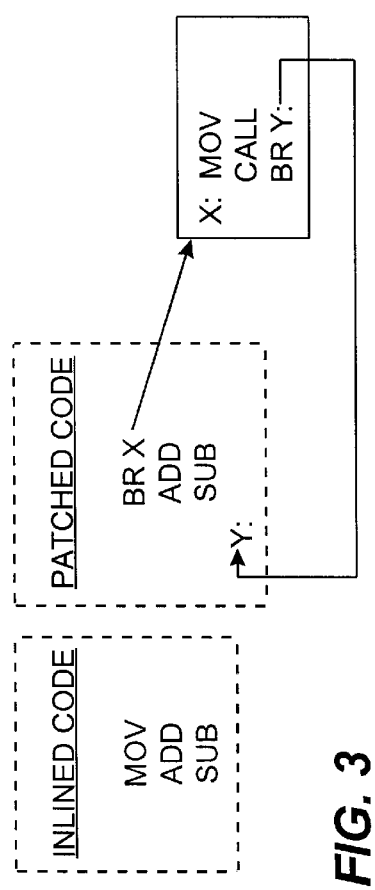
FIG. 3 shows exemplary implementation of the present invention.

In a branch implementation shown in FIG. 3, the first instruction of the inline code is replaced by a branch instruction (e.g., BR X where X is the location of the code implementing the virtual function call. On subsequent executions, the inlined code will not be executed and instead the code at location X is executed. The code implementing the virtual function call must end with a branch instruction to return to the end of the inlined code segment.

Figure 4:
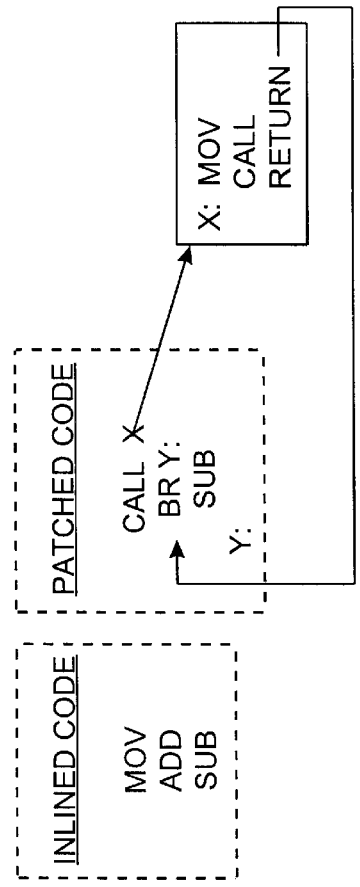
FIG. 4 shows an alternative embodiment in accordance with the present invention.

In a "call" implementation shown in FIG. 4, the first instruction of the inline code is replaced by a call instruction that call instructions at a location X that implement the virtual function call. At the end of the called sequence, a return instruction (RTN in FIG. 4) returns instruction execution to the location just after the call instruction in the patched code. The second instruction of the inline code is patched with a branch instruction pointing to the end of the inline code segment.

A call implementation shown in FIG. 4 can be very efficient and flexible in some processors, such as SPARC architecture processors, that implement call instructions in a manner that enables the called instruction sequence to be anywhere in the virtual memory space of the computer (e.g., 4 gigabyte address space in the case of SPARC architecture). In contrast, a typical branch instruction can only branch to a location within a limited range of address spaces around the branch instruction. This can be a significant advantage in cases where the patch code is actually compiled at run time. For example, if the code at location X in FIG. 3 and FIG. 4 were compiled only after it was determined that it was needed (i.e., after the method from which the inlined code originated was overridden), there may not be nearby empty memory space for holding the patching code. Hence, the patching code may have to be located outside the address range accessible through a branch instruction. Alternatively, the program can be filled with empty memory spaces that can be used for holding patching code as needed, however, this is a somewhat inefficient use of memory resources that may bloat the program and complicate managing the instruction cache.

Figure 5:
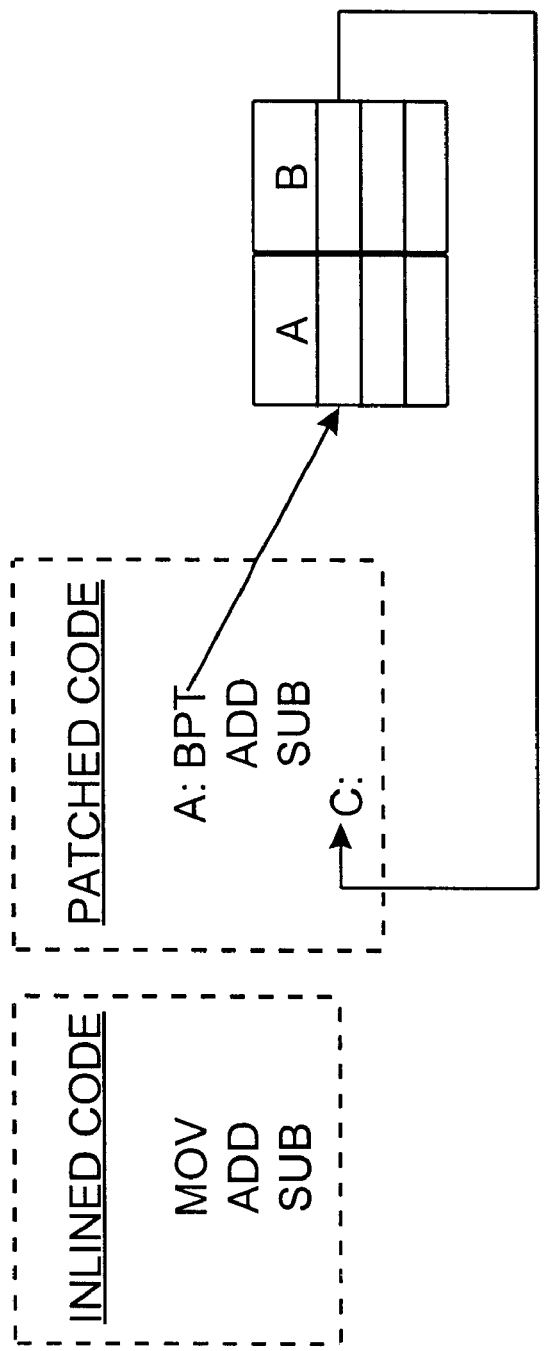
FIG. 5 shows another alternative embodiment in accordance with the present invention.

FIG. 5 illustrates an implementation using the breakpoint handler of the operating system to implement the patching code. As shown in FIG. 5, the first instruction of the inlined code is patched with a breakpoint instruction that throws an exception upon execution. The breakpoint instruction will be caught by the breakpoint handler which refers to a data structure such as a breakpoint table 601. For every breakpoint instruction "A", table 601 maps to a set of instructions "B" for handling the breakpoint. The instructions at B can in turn implement the virtual function call. It should be understood that this procedure will be quite a slow sequence, but in application environments where this case occurs rarely, a net performance improvement will be achieved. These inefficiencies can be recorded in the profile and corrected the next time the task is run.

In order to enable this feature, when the compiler creates the method, it must create a code fragment that implements the virtual function call as well as a code fragment implementing the inlined code itself. This virtual function call code fragment is called by the breakpoint handler and must be increment the saved return address to cause the code execution to jump to the end of the now invalid inlined code, and then perform a return from interrupt sequence. The address of the memory location to be patched and the address of the memory location holding the code fragment are placed in a data structure that is associated with the method being inlined. Whenever this method is subclassed, then the patch to the instructions in instruction data structure is made and the breakpoint handler is informed of the association.

An attractive feature about the system and method in accordance with the present invention is that the code, once generated, never needs to be recompiled and that no difficult stack patching procedures are required. Although there is some increase in the compiler complexity and the size of data structure, an improvement in code execution efficiency is apparent.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for optimizing execution of a group of bytecodes at runtime, the method comprising:

dynamically accumulating profile data by monitoring execution of the group of bytecodes at runtime wherein the profile data includes information regarding a set of classes used by the group of bytecodes including a subclassed indicator for the classes indicating whether each of the classes has been subclassed;

selecting a code generation method for a bytecode in the group of bytecodes based on the profile data, wherein the selecting uses the subclassed indicators from the information regarding the set of classes to handle method calls in the set of classes; and generating optimized native code for the bytecode according to the code generation method.

2. The method of claim 1, further comprising:

storing the optimized native code for the bytecode for reuse.

3. The method of claim 1, wherein the profile data is initialized to a startup state.

4. The method of claim 3, wherein the accumulating step updates the startup state based on runtime behavior of the group of bytecodes.

5. The method of claim 1, wherein the selecting step further comprises:

determining a method call category in the bytecode based on the profile data including determining if the subclass indicators indicate one or more of the classes has not been subclassed in a prior execution, and wherein the selecting step takes into account the method call category including assigning a direct call for each of the classes for which the corresponding subclass indicators indicate no prior subclassing.

6. The method of claim 5, wherein the selectable code generation methods include when the subclass indicators indicate prior subclassing a virtual function call, a combination of a direct call, inlining, and a virtual function call, and a class test based on the method call category.

7. The method of claim 6, wherein a code for inlining includes an instruction to redirect program execution.

8. The method of claim 7, wherein the instruction to redirect program execution includes a branch instruction, a call instruction, and a breakpoint instruction.

9. A system for optimizing execution of a group of bytecodes at runtime, the system comprising:

means for accumulating profile data by monitoring execution of the group of bytecodes at runtime, wherein the monitoring execution includes performing a class type test to generate a class type indicator and wherein the profile data includes information regarding a set of classes used by the group of bytecodes including one of the class type indicators for each of the classes;

means for selecting a code generation method for a bytecode in the group of bytecodes based on the profile data including one of the class type indicators; and means for generating an optimized native code for the bytecode according to the code generation method.

10. The system of claim 9, wherein the selecting means assigns an inline method for the code generation method when the class type indicator indicates a class is correct and otherwise assigns a virtual method for the code generation method and further comprising:

means for storing the optimized native code for the bytecode for reuse.

11. A storage device readable by a machine, embodying a program of instructions executable by a machine to perform method steps for optimizing execution of a group of bytecodes at runtime, the method steps comprising:

dynamically accumulating profile data by monitoring execution of the group of bytecodes at runtime, wherein the profile data includes information regarding a set of classes used by the group of bytecodes including an indicator for the classes indicating whether the classes have been subclassed;

selecting a code generation method for a bytecode in the group of bytecodes based on the profile data, wherein the selecting uses the subclassed indicators; and generating an optimized native code for the bytecode according to the selected code generation method.

12. A dynamic compiler for compiling a bytecode in a group of bytecodes at runtime, the dynamic compiler comprising:

a profiler for dynamically accumulating profile data by monitoring execution of the group of bytecodes, wherein the profile data includes information regarding a set of classes used by the group of bytecodes including indications of whether each of the classes has been subclassed and whether a class type of each of the classes is correct at a method invocation;

a code selector for selecting a code generation method for the bytecode by accessing the profile data including the indications; and a code generator for generating an optimized native code for the bytecode according to the code generation method.

13. The dynamic compiler of claim 12, further comprising:

a native code cache for storing the optimized native code for reuse.

14. The dynamic compiler of claim 12, wherein the code selector determines a category of a method call in the bytecode based on the subclass indication in the profile data, and wherein the code generation method corresponds to the method call category.

15. The dynamic compiler of claim 14, wherein the selectable code generation methods include a direct call, inlining, a virtual function call, and a combination of a direct call, inlining, and a virtual function call.

16. The dynamic compiler of claim 15, wherein the code selector performs the selecting by determining the subclass indication indicate that a class has not been subclassed in prior execution and selecting a direct method call for the code generation method and wherein when the subclass indication is modified to indicate the class has been subclassed, the code generator performs a class type check and based on the check makes a virtual function call or provides a branch back to a main method code.

17. The dynamic compiler of claim 15, wherein a code for inlining includes an instruction to redirect program execution.

18. The dynamic compiler of claim 17, wherein the instruction to redirect program execution includes a branch instruction, a call instruction, and a breakpoint instruction.

19. A virtual machine for processing a group of bytecodes comprising:

a bytecode verifier for analyzing a bytecode in the group of bytecode;

a bytecode interpreter for producing interpreted native code for the bytecode in the group of bytecodes; and a dynamic compiler for producing an optimized native code for the bytecode in the group of bytecodes, the dynamic compiler comprising a profiler that accumulates profile data by monitoring execution of the group of bytecodes, a code selector that selects a code generation method based on the profile data, and a code generator that generates the optimized native code based on the code generation method, wherein the code generation method includes direct calls, wherein the profile data includes information regarding a set of classes used by the group of bytecodes including an indication of whether a class has previously been subclassed and wherein the direct calls code generation method is selected for the classes for which the indication indicates the classes have not been subclassed, wherein the bytecode interpreter and the dynamic compiler run in parallel, and wherein the bytecode verifier invokes either the bytecode interpreter or the dynamic compiler for the bytecode.

* * * * *